(12) United States Patent
Cornelissen et al.

(10) Patent No.: US 10,843,160 B2
(45) Date of Patent: Nov. 24, 2020

(54) RAPID DEPRESSURIZATION OF A REACTOR SYSTEM

(71) Applicant: ExxonMobil Chemical Patents Inc., Baytown, TX (US)

(72) Inventors: Philip H. Cornelissen, Heverlee (BE); Paul J. Clymans, Kapelle-Op-Den-Bos (BE); Henri A. Lammens, Antwerp (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 338 days.

(21) Appl. No.: 15/762,377

(22) PCT Filed: Aug. 10, 2016

(86) PCT No.: PCT/US2016/046340
§ 371 (c)(1),
(2) Date: Mar. 22, 2018

(87) PCT Pub. No.: WO2017/058368
PCT Pub. Date: Apr. 6, 2017

(65) Prior Publication Data
US 2018/0257055 A1    Sep. 13, 2018

Related U.S. Application Data

(60) Provisional application No. 62/234,348, filed on Sep. 29, 2015.

(30) Foreign Application Priority Data

Dec. 18, 2015 (EP) .................................. 15201299

(51) Int. Cl.
*B01J 19/00* (2006.01)
*B01J 4/00* (2006.01)
*C08F 10/02* (2006.01)
*C08F 10/00* (2006.01)
*B01J 19/24* (2006.01)

(52) U.S. Cl.
CPC ............. *B01J 19/002* (2013.01); *B01J 4/008* (2013.01); *B01J 19/24* (2013.01); *B01J 19/2415* (2013.01); *C08F 10/00* (2013.01); *C08F 10/02* (2013.01); *B01J 2204/005* (2013.01); *B01J 2219/00006* (2013.01); *B01J 2219/0027* (2013.01); *B01J 2219/00094* (2013.01); *B01J 2219/00159* (2013.01); *B01J 2219/00162* (2013.01); *B01J 2219/00259* (2013.01)

(58) Field of Classification Search
USPC ............................. 526/64; 525/52; 422/131
See application file for complete search history.

(56) References Cited

U.S. PATENT DOCUMENTS

| | | | |
|---|---|---|---|
| 4,115,638 A | 9/1978 | Becker et al. | |
| 4,260,722 A * | 4/1981 | Pfleger | C08F 210/02 526/68 |
| 4,353,384 A * | 10/1982 | Gardner | B01J 3/02 137/454.6 |
| 4,804,725 A | 2/1989 | Kanne et al. | |
| 2015/0080533 A1 | 3/2015 | Nguyen et al. | |

* cited by examiner

*Primary Examiner* — Fred M Teskin
(74) *Attorney, Agent, or Firm* — ExxonMobil Chemical Patents Inc.—Law Department

(57) ABSTRACT

Systems and processes for rapidly depressurizing a reactor system are disclosed. The systems and processes are particularly useful in the high pressure polymerization of ethylene.

21 Claims, 6 Drawing Sheets

RAPID DEPRESSURIZATION OF A REACTOR SYSTEM

CROSS REFERENCE TO RELATED APPLICATIONS

This application is 371 National Phase application of International Application No. PCT/US2016/046340, filed Aug. 10, 2016, which claims the benefit of U.S. Ser. No. 62/234,348, filed Sep. 29, 2015, and EP application 15201299.3, filed Dec. 18, 2015, the disclosures of which are incorporated by reference in their entireties.

FIELD OF THE INVENTION

This invention relates to systems and processes for rapidly depressurizing a reactor system. The systems and processes disclosed are particularly useful in the high pressure polymerization of ethylene.

BACKGROUND OF THE INVENTION

High pressure polymerization reactors convert relatively low cost olefin monomers, such as ethylene optionally in combination with one or more comonomers, into valuable polyolefin products. Such processes, using oxygen or organic free-radical initiators, are known and have been used in industry for a long time. The polymerization takes place at relatively high temperatures and pressures and is highly exothermic.

High pressure polymerization processes generally use two main compressors to compress the monomer feed, each with multiple stages arranged in series, followed by a reactor where the polymerization occurs. A high pressure polymerization reactor system may include either a tubular reactor or an autoclave reactor. Such reactors typically operate at extremely high pressures in excess of 2000 bar and sometimes as high as 3100 bar. It is possible that no other large scale industrial process operates at a higher pressure.

High pressure polymerization of ethylene is an extremely exothermic process. For the reaction to continue to take place under favorable conditions, it is necessary to constantly remove heat from the polymerization zone. During polymerization, polymer can adhere to the inside walls of the reactor and substantially decrease heat removal capabilities. These deposits can detach from the walls and migrate through the reactor. They may cause blockages that result in severe and rapid pressure increases in the reactor, which in turn cause monomer decomposition or thermal runaway in the reaction mixture.

A high pressure reactor is protected against overpressure, overheating, and decomposition by rapid depressurization. Rapid depressurization of a commercial reactor would typically be initiated in response to a decomposition. Decompositions most often occur downstream of the initiator injection points, and cause temperatures and pressures within the reactor to rise rapidly. Immediate action must be taken to prevent a runaway reaction and further complications.

Commercial reactors generally have stringent design criteria for reactor depressurization capability. For example, a high pressure polymerization system may be designed such that the reactor can be depressurized to below 1000 bar within twelve seconds or even less. Such a design criteria, especially in larger capacity reactors, may require the use of multiple pressure relief valves. However, multiple pressure relief valves can lead areas of stagnant flow between the valves due to flow reversal during depressurization. The stagnant zones are hotter than other zones and can lead to overheating and failure of the reactor over time due to crack initiation. They can also make the decomposition more difficult to control. Additionally, it is also common to locate a pressure relief valve at the inlet of the preheater or between the preheater and the entry of the reactor. A pressure relief valve at this location can also lead to flow reversal and stagnant zones within the first reaction zone of the reactor, which is generally already the highest temperature and area most prone to decomposition. Background references include U.S. Pat. Nos. 4,804,725, 4,115,638, and U.S. Patent Application Publication No. 2015/080533.

There is a need for improved processes and systems for rapidly depressurizing high pressure polymerization systems, especially larger reactor systems, according to the strict design criteria often required.

SUMMARY OF THE INVENTION

The invention is related to reactor systems comprising a compressor in fluid connection with a reactor, the reactor comprising at least one reaction zone and at least one cooling zone; a first pressure relief valve located downstream of the reactor; and a second pressure relief valve located along the reactor in a cooling zone.

The invention is also related to reactor systems comprising a compressor system for compressing in fluid connection with a reactor, the reactor comprising at least one reaction zone and at least one cooling zone, wherein the total inner volume of the reactor is less than about 6 m$^3$; and a first pressure relief valve located downstream of the reactor.

The invention is also related to processes for rapidly depressurizing a reactor, the processes comprising opening a first pressure relief valve located downstream of the reactor. Such processes may also optionally comprise opening a second pressure relief valve located along the reactor in a cooling zone.

The systems and processes of the invention are particularly useful in the high pressure polymerization of ethylene.

DETAILED DESCRIPTION

Figure 1:
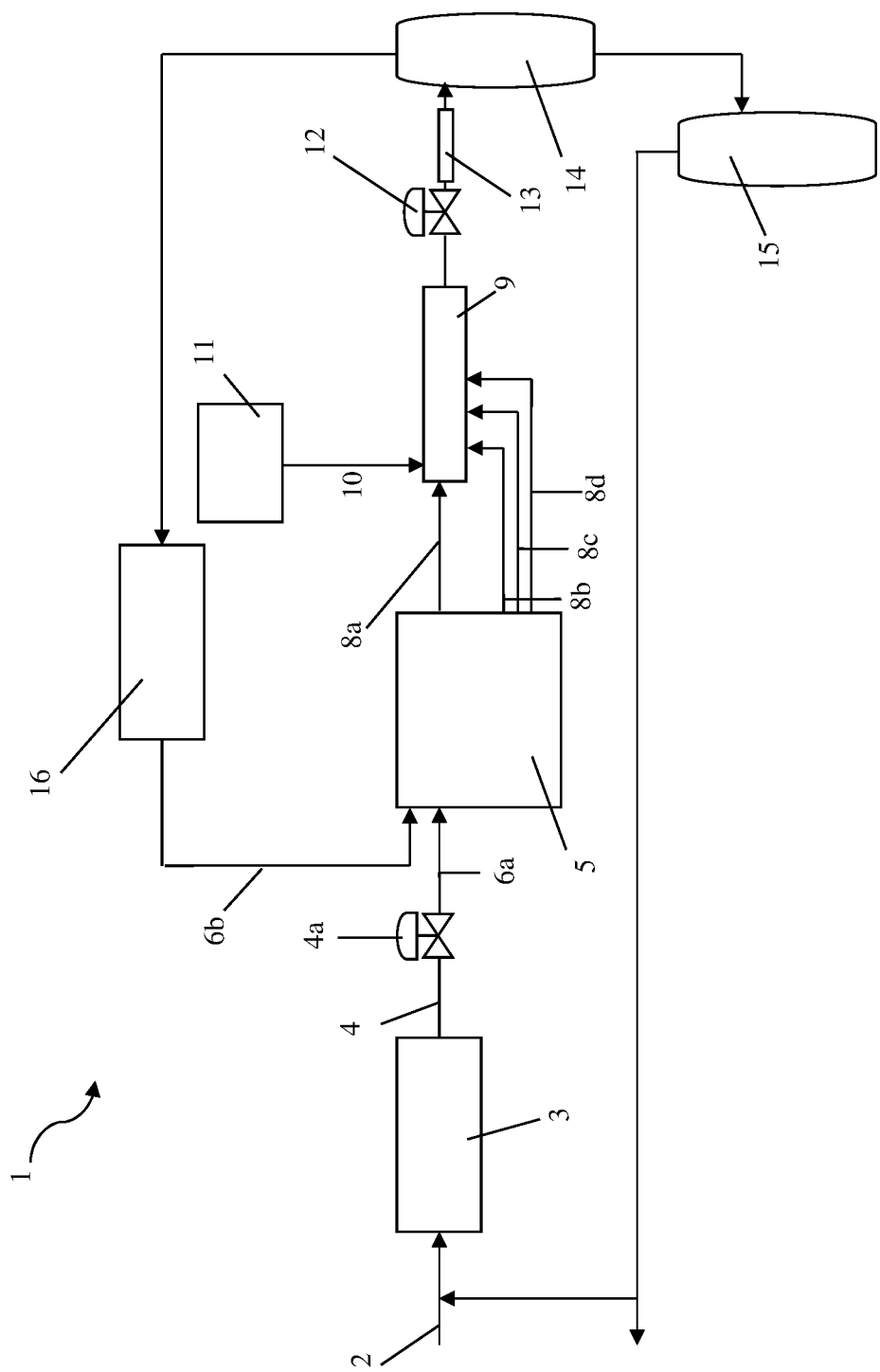
FIG. 1 shows schematically a general high pressure ethylene polymerization system.

As used herein, a pressure dump event refers to a process of rapidly depressurizing a polymerization reactor system. Typically, rapid depressurization reduces the pressure at one or more points in the reactor system from at or above about 2000 bar to at or below about 1000 bar in a relatively short amount of time. The pressure dump event may be initiated in response to any condition or event that renders rapid depressurization required or useful. In high pressure ethylene polymerization reactors, for example, rapid depressurization is commonly initiated in response to a decomposition detected within the reactor.

A pressure dump event generally begins when one or more pressure relief valves or the high pressure let down valve are opened to relieve pressure from the reactor, and ends when the reactor system has reached the desired pressure. For example, the pressure dump event may be considered to end when the pressure at the inlet of the preheater, or another location within the reactor system, falls below about 1000, 500, or 250 bar.

As used herein, a stagnant zone is a location within a reactor where, during a pressure dump event, the mass flux is zero and there is no extraction from the system. During a pressure dump event, the mass flux near a pressure relief valve may be zero, but that is because flow is oriented outwards from the system. Thus, this is an extraction point and not a stagnant zone according to the definition herein. The location of a stagnant zone may be determined by measuring or simulating the mass flux distribution along the reactor during a pressure dump event, as will be shown in further detail in the examples below.

High pressure ethylene polymerization reactor systems typically include at least one preheater upstream of the reactor. The preheater is used to heat one or more monomer streams, such as ethylene monomer, prior to entering the reactor. Such systems also typically include a high pressure let down valve downstream of the reactor. Under normal operating conditions, the reactor product mix exits the reactor through the high pressure let down valve where it is then cooled and sent through one or more separation systems.

It is common to locate a pressure relief valve at the inlet of the preheater or between the preheater and the entry of the reactor. It has been found that this is an undesirable location for a pressure relief valve because it can lead to flow reversal and stagnant zones within the first reaction zone of the reactor, which is generally already the area with the highest temperatures and most prone to decomposition. The stagnant zones are hotter than other zones and can lead to overheating and failure of the reactor over time due to crack initiation.

Smaller capacity polymerization reactor systems, such as those having a total inner volume of the reactor of at or less than about 6 $m^3$, may require the use of only one pressure relief valve in addition to the high pressure let down valve to achieve the desired rapid depressurization capability. As noted above, a pressure relief valve has commonly been located upstream of the preheater inlet or between the preheater and the reactor in processes of the prior art. In embodiments of the invention, however, where the total inner volume of the reactor is at or less than about 6 $m^3$, a single pressure relief valve is located downstream of the reactor. It is upstream of the high pressure let down valve. With a pressure relief valve at this location, instead of upstream of the preheater inlet or between the preheater and the reactor, the flow direction in the reactor is not reversed within the first reaction zone during a pressure dump event. Thus, such reactor systems are capable of rapidly depressurizing a smaller capacity reactor during a pressure dump event without creating stagnant zones within the reactor.

Larger capacity polymerization reactor systems may require the use of multiple pressure relief valves, in addition to the high pressure let down valve. However, the use of multiple pressure relief valves can be particularly problematic in causing flow reversal and stagnant zones during a pressure dump event. The stagnant zones are typically located somewhere between the valves. If these stagnant zones cannot be eliminated, which they generally cannot when multiple valves are used, it is advantageous to control the location of the stagnant zones and ensure that they are within a cooling zone of the reactor during a pressure dump event, rather than within a much hotter reaction zone. Furthermore, the stagnant zones will likely move in location during the duration of the pressure dump event. It is also advantageous to ensure that, although they move, they remain entirely within a cooling zone of the reactor.

The location of stagnant zones is affected by the design, number, and location of the pressure relief valves used. The invention enables stagnant zones to be located within a cooling zone of the reactor during a pressure dump event and eliminates the potential for flow reversal and stagnant zones within the first reaction zone. Additionally, although the location of stagnant zones may move over time, the invention enables the stagnant zones to remain entirely within a cooling zone during the duration of the pressure dump event.

One or more rupture disks may be present in the secondary compressor of the reactor system as a backup pressure relief measure, and may be used if any of the main pressure relief valves or the high pressure let down valve fail. The reactor itself may also comprise one or more rupture disks. For example, any reaction zone may comprise one or more rupture disks or each reaction zone may comprise one or more rupture disks. The rupture disks, when used, are in addition to the pressure relief valve(s) and the high pressure let down valve.

A pressure dump event may be initiated and carried out in various ways. It may be started by opening one or more pressure relief valves, in any order or simultaneously. For example, in systems comprising a pressure relief valve downstream of the reactor and a pressure relief valve along the reactor in a cooling zone, these two valves may be opened in any order or simultaneously. A high pressure let down valve may also be opened before or after opening the pressure relief valves or simultaneously. The high pressure let down valve may be opened partially or completely, and may be closed partially or completely once it is confirmed that one or more of the pressure relief valves are opened. This may be confirmed in any suitable way, for example, using a limit or position switch or another measurement device indicating the position of the valve.

In a preferred embodiment of the invention, the pressure dump event is initiated by opening the high pressure let down valve and at least two pressure relief valves simultaneously. Once it is confirmed that the at least two pressure relief valves are opened, the high pressure let down valve is closed partially or completely and the pressure dump continues through the pressure relief valves.

At any time during the pressure dump event or simultaneously with the initiation of the pressure dump event, the secondary compressor may also be stopped. One or more, or all, of the suction valve(s) to the secondary compressor may be closed. To reduce monomer loss and release of material to the atmosphere, one or more feed valves to the reactor may also be closed after initiation of the pressure dump event. This helps to keep the monomer in the secondary compressor interstage within the secondary compressor. In a preferred embodiment of the invention, one or more, or all, of the feed valves to the reactor are closed once the pressure at the inlet to the preheater or within one or more zones of the reactor is at or below about 1500 bar.

Polyethylene Process

FIG. 1 is a general schematic of a polymerization plant 1 including an ethylene feed line 2 which supplies fresh ethylene to a primary compressor 3. The function of the primary compressor 3 is to pressurize fresh ethylene to the pressure of the ethylene recycle system, for feed to the secondary compressor 5. The primary compressor 3 may be a single compressor, that alone pressurizes the ethylene to the pressure of the recycle stream, or it may be two or more compressors in series or in parallel that, in combination, pressurize the fresh ethylene to the pressure of the ethylene recycle system. In some existing ethylene reactor plants, the ethylene discharged from the primary compressor 3 is divided into two streams (not shown), one stream being combined with recycled ethylene and fed to the suction of the secondary compressor 5, and the other stream being injected into the ethylene/polymer mixture downstream of the high pressure let down valve, thereby providing rapid cooling of the ethylene/polymer mixture prior to entry into the product separation unit.

The ethylene discharged from the primary compressor 3 flows via conduit 4 having valve 4a to conduit 6a and then to the secondary compressor 5. Recycled ethylene is also supplied to the secondary compressor 5 via conduit 6b from a high pressure recycle system 16. The secondary compressor 5 compresses the ethylene to a pressure of at least 1000 bar for supply to the reactor 9. The secondary compressor 5 is typically a unit driven by a single motor, but may comprise two or more compressors in series or in parallel driven by separate motors (not shown). Any configuration of compressors is intended to be within the scope of this disclosure as long as it is adapted to compress the ethylene from the pressure of the ethylene as it leaves the primary compressor 3 to the desired reactor pressure of at least 1000 bar.

The secondary compressor 5 discharges compressed ethylene in four streams 8a, 8b, 8c, and 8d. Stream 8a may be heated by a steam jacket (not shown) prior to entry into the front end of the reactor 9. The three remaining ethylene streams 8b, 8c, and 8d each enter the reactor as side streams, and may be cooled prior to entry to the reactor.

The reactor 9 has an initiator pumping station 11 for injecting initiator into the reactor. The initiator may be injected through one initiator inlet 10, or through multiple initiator inlets (not shown). The reactor system may comprise multiple reaction zones and/or multiple cooling zones. Each reaction zone may be followed by a cooling zone immediately downstream. In a reactor with multiple initiator inlets, each initiator inlet may be considered to define the start of a reaction zone. Each side stream inlet of cold monomer may be considered to define the end of a reaction zone and the start of a cooling zone. Injection of the initiator causes an exothermic temperature rise downstream of the inlet, which is removed by cooling. The cooling may be effected through the reactor wall via a cooling jacket (not shown) fitted on the reactor 9, and aided by a cooling liquid and/or by feed of the cold monomer downstream.

The reactor 9 may also have a modifier pumping station (not shown) for injection of modifier into the reactor through one or more front and/or side streams. The modifier may be fed through a flow controller (not shown) for tailoring the amount of modifier fed through each stream. Also, the initiator and modifier could be premixed (not shown) and fed together through the initiator pumping station 11, eliminating the need for a separate modifier pumping station.

Polymerization commences immediately downstream of the start of the first reaction zone thereby causing the temperature of the reaction mixture to rise. As the temperature rises, initiator decomposition and polymerization rates increase, accelerating heat generation and causing the temperature to rise further. As initiator is consumed, initiation and polymerization slow and, at the point where heat generation equals heat conducted away from the reaction mixture, the temperature peaks and then begins to fall.

The reactor system typically has a high pressure let down valve 12 downstream of the reactor. The high pressure let down valve 12 controls the pressure in the reactor 9. Opening the valve decreases pressure in the reactor and closing the valve increases the pressure. A pressure drop exists along the length of the reactor which forces the reaction mixture along the reactor at a desired velocity. Immediately downstream of the high pressure let down valve 12 is product cooler 13. The reaction mixture is cooled and then exits the product cooler 13 into high pressure separator 14. The overhead gas from the high pressure separator 14 flows into the high pressure recycle system 16 where the unreacted ethylene is cooled and returned to the secondary compressor 5.

The polymer product mixture flows from the bottom of the high pressure separator 14 into the low pressure separator 15, which separates almost all of the remaining ethylene from the polymer. That ethylene is transferred either to a flare (not shown) or a purification unit (not shown) or is recycled via the primary compressor 3. Molten polymer flows from the bottom of the low pressure separator 15 to downstream processing, such as to an extruder (not shown) for extrusion, cooling, and pelletizing.

The proportion of the total ethylene which enters the reactor 9, whether in the main feed stream 8a or as a side stream 8b, 8c, or 8d which is converted to polymer before exiting the reactor 9 is referred to as the conversion. In embodiments of the invention, the conversion may be from 30% to 40% and alternatively at least 35%. Conversions of higher than 40% are feasible but generally are not preferred, partly because the viscosity of the reaction mixture increases with its polymer content, which leads in turn to an increase in the pressure drop required to maintain the necessary flow velocity.

The reactor systems of the invention comprise at least one pressure relief valve. The at least one pressure relief valve may be located downstream of the reactor. The at least one pressure relief valve may be located immediately downstream of the reactor, and upstream of a high pressure let down valve. In smaller reactors, wherein the total inner volume of the reactor is less than about 6 m3, one pressure relief valve located immediately downstream of the reactor may be sufficient to achieve the rapid depressurization capabilities required for commercial scale reactors. However, these smaller reactors may also further comprise at least one pressure relief valve along the reactor in a cooling zone.

The reactor systems of the invention, especially for larger reactors where the total inner volume of the reactor is at or greater than about 6 m3, may comprise at least two pressure relief valves, with at least one located downstream of the reactor and at least one located along the reactor in a cooling zone. For example, the reactor may comprise at least three cooling zones spaced lengthwise along the reactor, with a pressure relief valve located along the reactor in cooling zone three or a cooling zone further downstream. The reactor may also comprise at least four cooling zones spaced lengthwise along the reactor, with a pressure relief valve located along the reactor in cooling zone four or a cooling zone further downstream. At least one pressure relief valve may be located in any cooling zone. The pressure relief valves may be dump valves, vent valves, blowdown valves, or any other suitable valve for rapid depressurization.

The reactor systems of the invention may further comprise one or more preheaters upstream of the reactor. The systems may or may not comprise a pressure relief valve at the inlet of the preheater or between the preheater and the reactor. In a preferred embodiment of the invention, the systems do not comprise a pressure relief valve at the inlet of the preheater or between the preheater and the reactor. The systems and processes of the invention may be capable of reducing the operating pressure at the inlet of the preheater from at or above about 2000, 2500, or 3000 bar to at or below about 1000 bar in at or less than about 12 seconds, 10 seconds, 8 seconds, 6 seconds, 4 seconds, or even 2 seconds.

The ethylene polymer product manufactured according to the invention may have a density of from 0.910 to 0.940 g/cm3 (as measured by ASTM D1505) and a melt index of from 0.1 to 40 dg/min (as measured by ASTM D1238). For example, the ethylene polymer obtained from the process according to the invention may have a density of from 0.915 to 0.920 g/cm3 and a melt index of from 2 to 6 dg/min. The processes herein may be used for the manufacture of ethylene homopolymers and copolymers, such as ethylene-vinyl acetate copolymers. Other possible comonomers include propylene, 1-butene, iso-butene, 1-hexene, 1-octene, other lower alpha-olefins, methacrylic acid, methyl acrylate, acrylic acid, ethyl acrylate and n-butyl acrylate. Reference herein to "ethylene" should be understood to include ethylene and comonomer mixtures, except where another meaning is implied by context.

Modifier

The terms "modifier" or "chain transfer agent" as used herein refer to a compound added to the process to control the molecular weight and/or melt index of a produced polymer. Examples of such include tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2,1-bromo-2-chloroethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1,1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, and phosphine.

The modifier may comprise a $C_2$ to $C_{20}$ or a $C_2$ to $C_{12}$ aldehyde. The modifier may also comprise a $C_2$ to $C_{20}$ or a $C_2$ to $C_{12}$ saturated modifier. Additionally, the modifier may comprise a $C_2$ to $C_{20}$ or a $C_2$ to $C_{12}$ unsaturated modifier. For further details on modifiers, see *Advances In Polymer Science*, Vol. 7, pp. 386-448, (1970). Table 7 therein ranks several transfer agents in order of the chain transfer constant determined under set conditions. Aldehydes, including propionaldehyde and acetaldehyde, are known to have favorably higher chain transfer constants, compared to other chain transfer agents such as propane, butane, isobutane, propene, isobutene, and 1-butene.

The modifier can be added into the reaction mixture in any suitable way. For example, the modifier may be injected along with the initiator into the reactor, thereby reducing the amount of initiator required for the process resulting in monetary savings as initiators are generally costly. The modifier may also be injected in the discharge or suction of the secondary compressor. The modifier may also be injected directly into the reactor and premixed with initiator.

Initiator

The term "initiator" as used herein refers to a compound that initiates the free radical ethylene polymerization process. Suitable initiators for use in the present invention include, but are not limited to, organic peroxide initiators and mixtures thereof. Further examples of suitable initiators include peresters including, but not limited to, bis(2 ethylhexyl)peroxydicarbonate, tert-Butyl per(2-ethyl)hexanoate, tert-Butyl perpivalate, tert-Butyl perneodecanoate, tert-Butyl perisobutyrate, tert-Butyl per-3,5,5,-trimethylhexanoate, tert-Butyl perbenzoate, and dialkyl peroxides including, but not limited to, di-tert-butyl peroxide, and mixtures thereof. The initiator(s) may be mixed, typically in a hydrocarbon solvent, and then injected into the reactor at a suitable location. Any suitable pump may be used, for example, a hydraulically driven piston pump.

EXAMPLES

Figure 2:
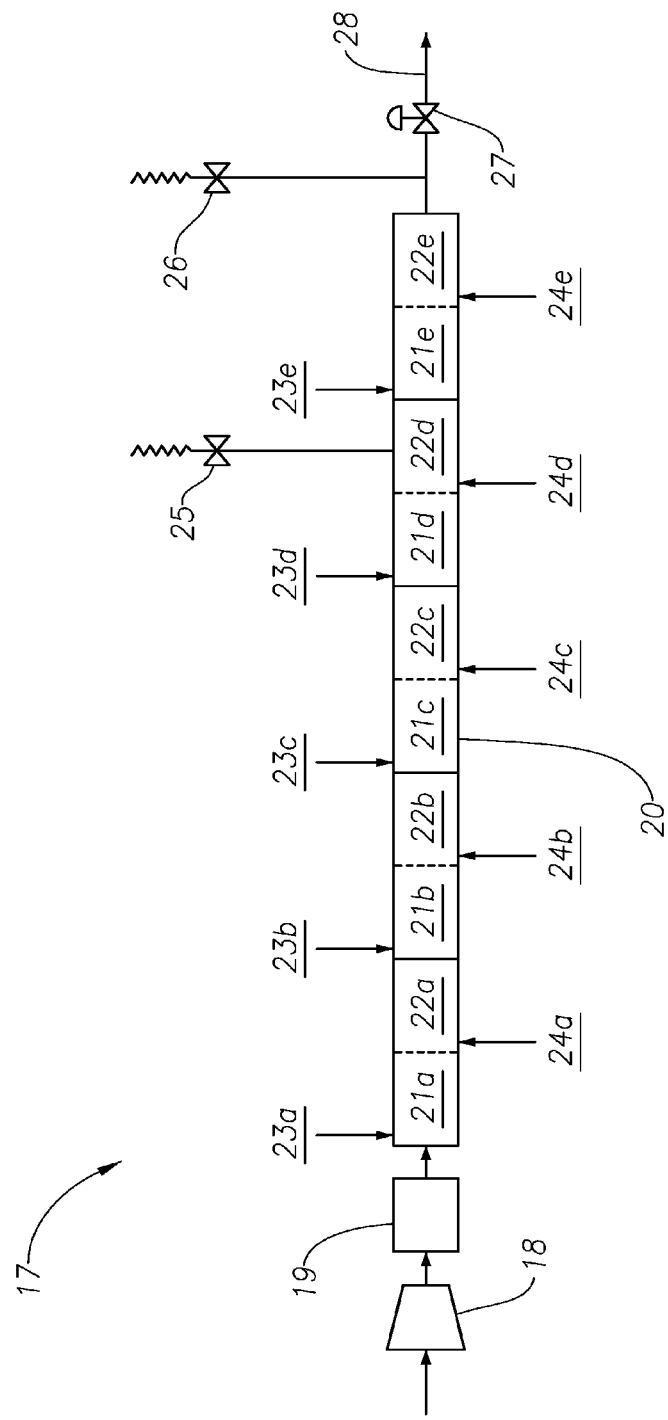
FIG. 2 shows schematically a reactor system according to embodiments of the invention.

FIG. 2 is a schematic design of a high pressure polyethylene reactor system 17 similar to the reactor system used in the following examples. In this reactor system 17, compressed ethylene flows from secondary compressor 18 into preheater 19. The compressed ethylene exits preheater 19 and enters the reactor 20. Unlike other high pressure ethylene polymerization systems, reactor system 17 does not have a pressure relief valve upstream of the preheater 19 or between the preheater 19 and entry to the reactor 20.

The reactor 20 includes five reaction zones, 21a-e, and five cooling zones 22a-e, in the arrangement shown in FIG. 2. The reaction zones may be numbered sequentially, with reaction zone 1 (e.g. 21a) nearest to the inlet of the reactor 20 and reaction zone 5 (e.g. 21e) nearest to the exit of the reactor 20. The cooling zones may also be numbered in like manner A pressure relief valve 25 is located along the reactor in cooling zone 4 (e.g. 22d). Another pressure relief valve 26 is located just downstream of cooling zone 5 (e.g. just downstream of 22e), and just upstream of high pressure let down valve 27. In this system, both pressure relief valves 25 and 26 are dump valves. The product mixture exits the high pressure let down valve 27 via conduit 28.

Example 1~450 KTA Reactor System (Simulated)

A pressure dump event was simulated in a reactor system similar to that of FIG. 2, having a design capacity of about 450 KTA, using computational fluid dynamics ("CFD")

modeling software. The software used in this simulation was EcosimPro™ Modelling and Simulation Software, developed by Empresarios Agrupados A.I.E. in Madrid, Spain. In the reactor system of the simulation, a distance of 0 m was designated as the location of the inlet to the preheater. Table 1 below provides the distance in meters from the inlet of the preheater to the start of the reaction zone for each of the five reaction zones.

TABLE 1

Location of Reaction Zones for 450 KTA Reactor System

| Location | Distance from Inlet of Preheater, m |
| --- | --- |
| Preheater | 0 |
| Reaction Zone 1 | 351 |
| Reaction Zone 2 | 501 |
| Reaction Zone 3 | 660 |
| Reaction Zone 4 | 955 |
| Reaction Zone 5 | 2009 |

Figure 3:
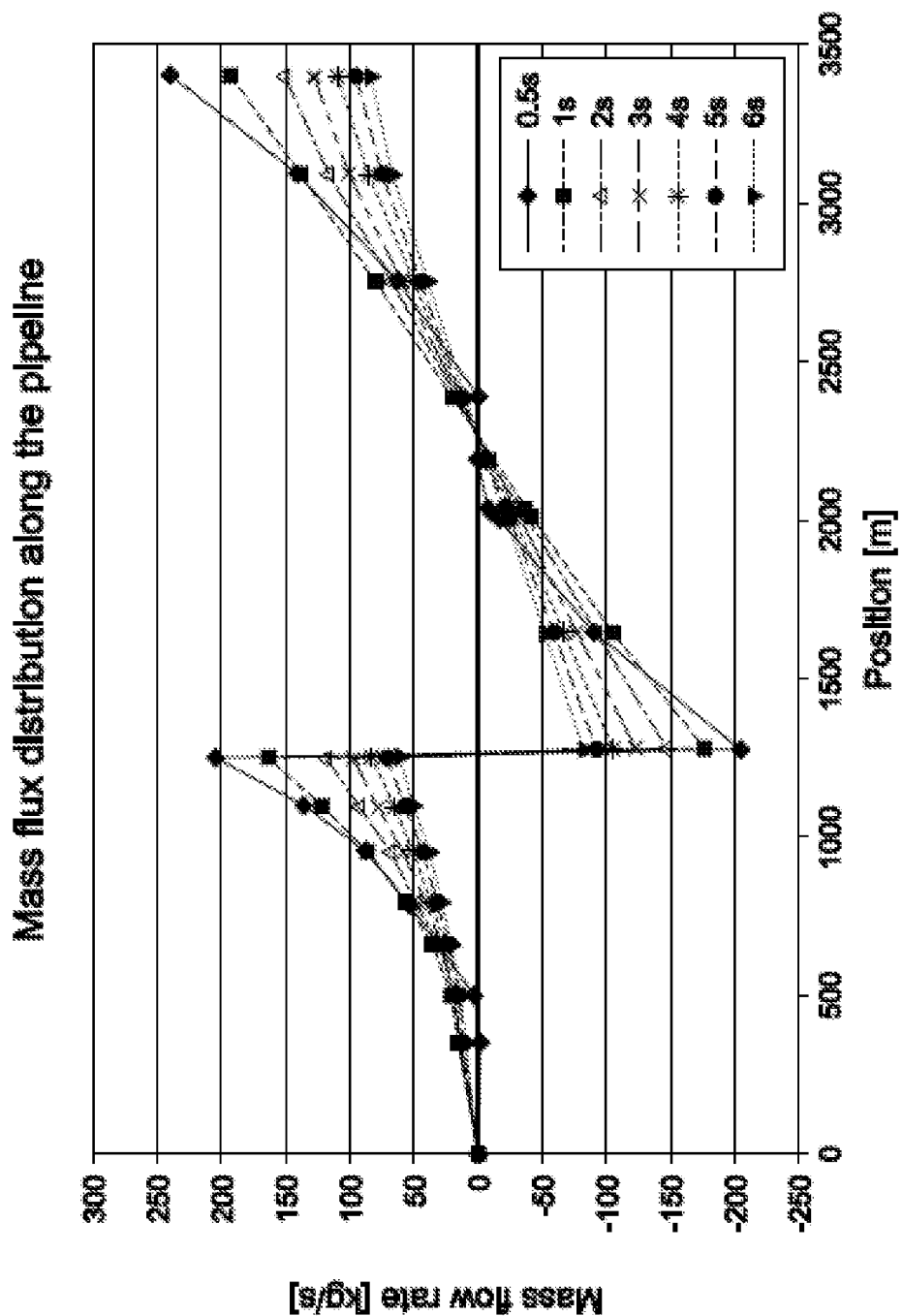
FIG. 3 is a mass flux distribution within the reactor for a polymerization reactor system similar to that of FIG. 2 having a capacity of about 450 KTA.

The operating pressure of the simulated reactor was about 3000 bar. The pressure dump event was initiated by opening both pressure relief valves 25 and 26 simultaneously. FIG. 3 is a plot of mass flux distribution at various locations in the reactor and points in time following the start of the pressure dump event. In FIG. 3, the mass flow rate in kg/s is shown on the Y axis. A positive mass flow rate indicates flow moving in the direction from the preheater toward the high pressure let down valve. A negative mass flow rate indicates flow moving in the direction from the high pressure let down valve to the preheater. Position in meters is shown on the X axis, with the position of 0 m corresponding to the inlet of the preheater as noted above.

In FIG. 3, the time of 0 seconds was the start of the pressure dump event. As can be seen, the mass flow rate at each position varies with time as the depressurization proceeds. FIG. 3 shows that, after both pressure relief valves 25 and 26 are opened, there are two locations within the reactor where the mass flow rate is zero. The first location is near the pressure relief valve located along the reactor in cooling zone 4, at a position of about 1250 m from the inlet of the preheater. Here, the mass flow is oriented outwards from the system, so this is an extraction point and thus not a stagnant zone. The second location is at a position varying from between about 2250 m to about 2340 m, within cooling zone 5 in both cases. At the beginning, it is at about 2340 m and then it moves in the direction toward the preheater to about 2250 m. This location is a stagnant zone because there is no mass flow and no extraction.

Figure 4:
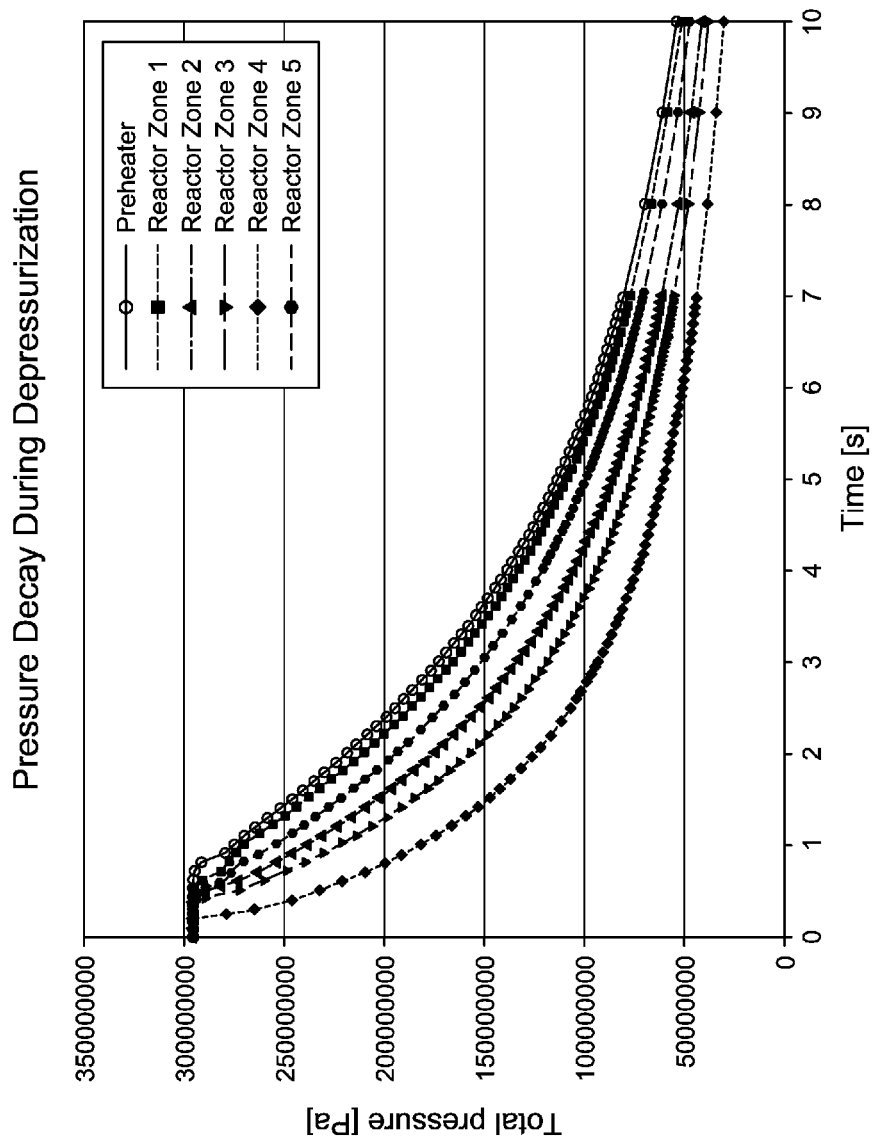
FIG. 4 is a graph of pressure decay over time at various points within the reactor system for the polymerization reactor system of FIG. 3.

FIG. 4 shows the pressure decay over time at the entrance of each of the reaction zones and the preheater during the pressure dump event. FIG. 4 shows that in this system the pressure at the entrance to the preheater decays at the slowest rate, but falls below 1000 bar in less than 6 seconds, with the pressure in each reaction zone falling below 1000 bar faster.

Example 2—420 KTA Reactor System (Simulated)

Similar to Example 1, a pressure dump event was simulated in a reactor system similar to that of FIG. 2, but having a slightly smaller design capacity of about 420 KTA. The operating pressure of this simulated reactor was also about 3000 bar. In like manner to Example 1, the pressure dump event was started by opening both pressure relief valves 25 and 26 simultaneously.

Figure 5:
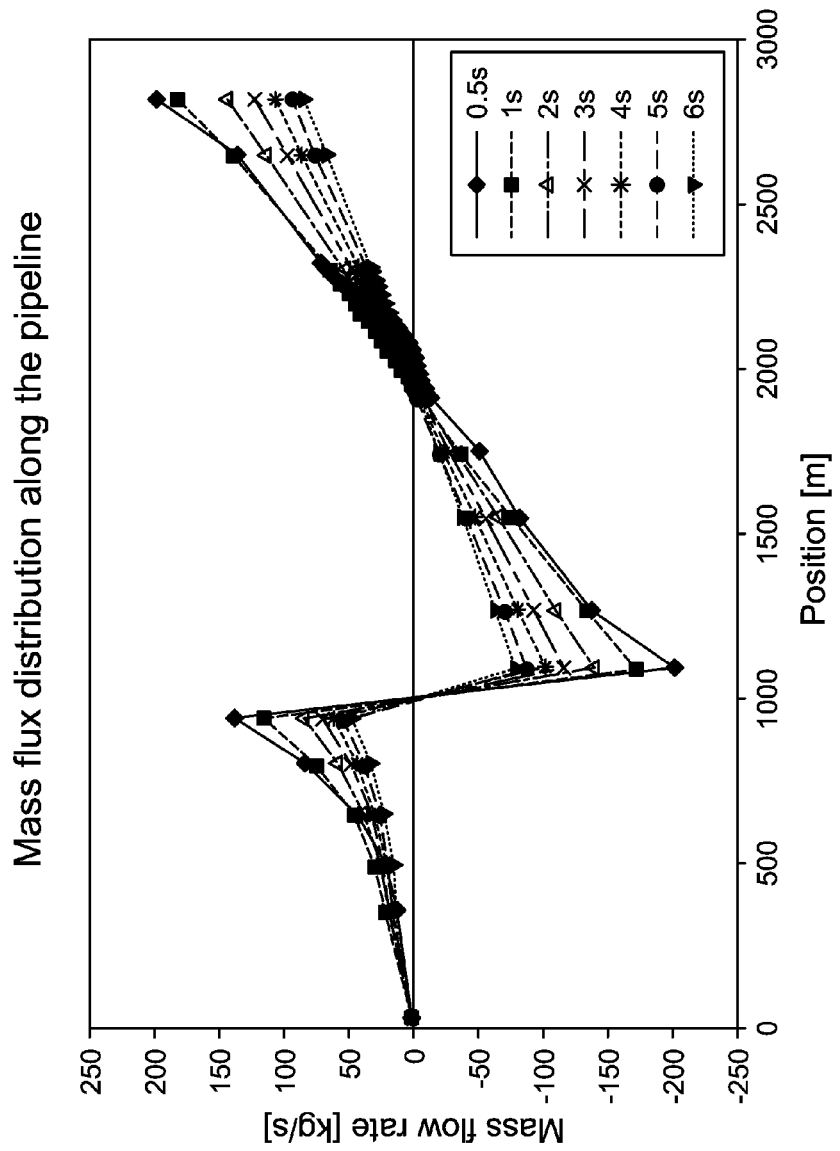
FIG. 5 is a mass flux distribution within the reactor for a polymerization reactor system similar to that of FIG. 2 having a slightly smaller capacity of about 420 KTA.

FIG. 5 is a plot of mass flux distribution at various locations in the reactor and points in time following the start of the pressure dump event. A positive mass flow rate indicates flow moving in the direction from the preheater toward the high pressure let down valve. A negative mass flow rate indicates flow moving in the direction from the high pressure let down valve to the preheater. The position of 0 m again corresponded to the inlet of the preheater.

FIG. 5 shows that, after both pressure relief valves 25 and 26 are opened, there are again two locations within the reactor where the mass flow rate is zero. The first location is near the pressure relief valve located along the reactor in cooling zone 4, at a position of about 1000 m from the inlet of the preheater. This is an extraction point and thus not a stagnant zone. The second location varies from between about 1960 m to about 2020 m, within cooling zone 5 in both cases. This location is a stagnant zone because there is no mass flow and no extraction.

Figure 6:
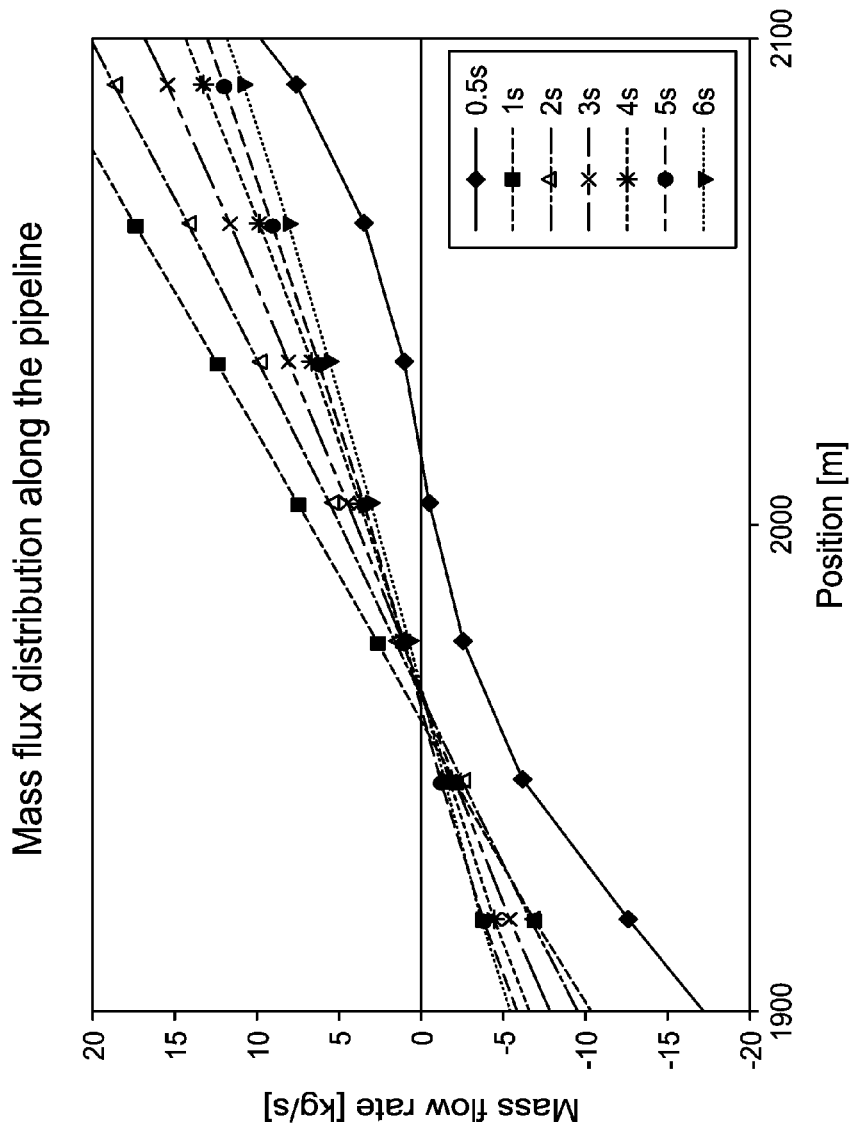
FIG. 6 is a zoomed in version of the mass flux distribution in FIG. 5, zoomed in at the location of a stagnant flow zone about 2000 m from the preheater inlet.

FIG. 6 is a zoom in on FIG. 5 around the position of 2000 m, where the stagnant zone is located. FIG. 6 shows that the stagnant zone is at about 2020 m initially, and then moves in the direction of the preheater and stays almost steadily at around 1960 m. In this system, the pressure at the entrance to the preheater and at every reaction zone also fell below 1000 bar in less than 6 seconds.

The systems and processes in these examples simply illustrate possible embodiments of the invention. One skilled in the art will appreciate that a particular system and/or process could vary from these examples and still be within the scope of this invention, as defined by the following claims.

What is claimed is:

1. A reactor system comprising:
    a. a compressor in fluid connection with a reactor, the reactor comprising at least one reaction zone and at least one cooling zone;
    b. a first pressure relief valve located downstream of the reactor;
    c. a second pressure relief valve located along the reactor in the cooling zone; and
    d. a preheater upstream of the reactor;
    wherein the system does not have a pressure relief valve upstream of the preheater or between the preheater and the reactor.

2. The system of claim 1, wherein the reactor comprises at least three cooling zones, and a second pressure relief valve is located along the reactor in cooling zone three or a cooling zone further downstream.

3. The system of claim 1, wherein the reactor comprises at least four cooling zones, and a second pressure relief valve is located along the reactor in cooling zone four or a cooling zone further downstream.

4. The system of claim 1, further comprising a preheater upstream of the reactor, wherein the system is capable of reducing the operating pressure at the inlet of the preheater from above about 2000 bar to below about 1000 bar in less than 10 seconds.

5. The system of claim 1, wherein the reactor further comprises at least one rupture disk.

6. The system of claim 1, further comprising a stagnant zone within the reactor during a pressure dump event, wherein the stagnant zone is located entirely within a cooling zone.

7. The system of claim 6, wherein the location of the stagnant zone moves during a pressure dump event, but remains entirely within a cooling zone.

8. The system of claim 1, wherein the first pressure relief valve is located upstream of a high pressure let down valve.

9. The system of claim 1, wherein the compressor is adapted to compress olefin monomer to a pressure of at or above about 2000 bar.

10. The system of claim 9, wherein the olefin monomer comprises ethylene.

11. A process for rapidly depressurizing a polymerization reactor downstream of a primary and a secondary compressor, the process comprising opening a first pressure relief valve located downstream of the reactor, and shutting down the secondary compressor.

12. The process of claim 11, wherein the reactor comprises at least one reaction zone and at least one cooling zone, and further comprising opening a second pressure relief valve located along the reactor in a cooling zone.

13. The process of claim 12, further comprising opening a high pressure let down valve located downstream of the first pressure relief valve.

14. The process of claim 12, further comprising opening the first pressure relief valve and the second pressure relief valve simultaneously.

15. The process of claim 13, further comprising opening the first pressure relief valve, the second pressure relief valve, and the high pressure let down valve simultaneously.

16. The process claim 13, further comprising closing the high pressure let down valve partially or completely after confirming that at least one of the first pressure relief valve or the second pressure relief valve is open.

17. The process of claim 11, wherein the process is adapted to reduce the operating pressure at the inlet of a preheater upstream of the reactor from above about 2000 bar to below about 1000 bar in less than 10 seconds.

18. The process of claim 11, wherein the secondary compressor comprises at least one suction valve, and the process comprises closing the at least one suction valve.

19. The process of claim 11, wherein the reactor comprises at least one feed valve, and the process further comprises closing the at least one feed valve.

20. The process of claim 19, further comprising closing the at least one feed valve when the pressure at any point within the reactor is at or below about 1500 bar.

21. The process of claim 11, further comprising initiating the process in response to a decomposition detected within the reactor.

* * * * *